United States Patent [19]

Gibbs et al.

[11] 4,451,632
[45] May 29, 1984

[54] HIGH VINYLIDENE CHLORIDE CONTENT INTERPOLYMER COATING RESINS AND METHOD OF PREPARATION

[75] Inventors: Dale S. Gibbs; Warren L. Treptow, both of Midland, Mich.

[73] Assignee: The Dow Chemical Company, Midland, Mich.

[21] Appl. No.: 395,442

[22] Filed: Jul. 6, 1982

Related U.S. Application Data

[63] Continuation-in-part of Ser. No. 277,305, Jun. 25, 1981, abandoned.

[51] Int. Cl.³ ............................................. C08F 14/08
[52] U.S. Cl. .................................... 526/317; 524/559
[58] Field of Search ............... 526/317; 524/559, 568, 524/460

[56] References Cited

U.S. PATENT DOCUMENTS

| | | | |
|---|---|---|---|
| 2,570,478 | 10/1951 | Pitzl | 526/317 |
| 2,824,025 | 2/1958 | McIntyre | 526/317 |
| 3,309,330 | 3/1967 | Settlage | 260/29.6 |
| 3,380,844 | 4/1968 | Menikheim | 260/29.6 |
| 3,424,706 | 1/1969 | Smith | 260/29.6 |
| 3,714,103 | 1/1973 | Huhn | 260/29.6 |
| 3,753,940 | 8/1973 | Trofimow | 526/317 |
| 4,153,592 | 5/1979 | Burroway | 526/317 |
| 4,168,372 | 9/1979 | Meier | 526/317 |
| 4,296,013 | 10/1981 | Gibbs | 260/29.6 |

*Primary Examiner*—Paul R. Michl
*Attorney, Agent, or Firm*—D. R. Howard

[57] ABSTRACT

A process for preparing, in aqueous emulsion, controlled interpolymer compositions. The interpolymer compositions have polymerized therein from about 86 to 92 mole percent, vinylidene chloride, from about 14 to 8 mole percent of a comonomer mixture of methyl methacrylate and a comonomer selected from the group consisting of acrylonitrile, methacrylic acid and methacrylonitrile in a ratio of the comonomer to methyl methacrylate of from about 0.5:1 to 2:1, and from about 0.5 to 1.0 weight percent itaconic acid, based on weight of vinylidene chloride plus comonomer mixture. The interpolymers are prepared in a three step process. The third step, or Step III, wherein monomer feeding is step-wise reduced for a portion of the step and a polymerization initiator is added at generally the same constant rate as the rate of addition in Steps I and II, generally reduces the amount of unreacted mixed monomers remaining after monomer addition is completed. As such, the detrimental results produced when a large amount of polymer composition variation in the direction of high vinylidene chloride fractions are markedly reduced.

14 Claims, 2 Drawing Figures

HIGH VINYLIDENE CHLORIDE CONTENT INTERPOLYMER COATING RESINS AND METHOD OF PREPARATION

CROSS-REFERENCE TO RELATED APPLICATION

This application is a continuation-in-part of the co-pending application Ser. No. 277,305, filed June 25, 1981, now abandoned.

BACKGROUND OF THE INVENTION

The homopolymer of vinylidene chloride is generally insoluble at room temperature in conventional organic solvents, e.g., pure tetrahydrofuran. However, when vinylidene chloride is interpolymerized with one or more monomers copolymerizable therewith, useful materials result which may be soluble at room temperature in conventional organic solvents. Typical copolymerizable monomers include acrylonitrile, methacrylonitrile, methyl acrylate (or other $C_2$–$C_{15}$ alcohol esters of acrylic or methacrylic acid, e.g., methyl methacrylate), acrylic acid, itaconic acid, chloroacrylonitrile, vinyl chloride, vinyl bromide, vinylidene bromide, and the like. Useful organic solvents include mixtures of toluene and tetrahydrofuran.

These materials find particular use in the cellophane industry where a very thin (usually about 0.05–0.15 mil) coating of a so-called "soluble" vinylidene chloride copolymer resin is deposited from a solvent, or mixture of solvents, on both sides of a cellophane film. This thin coating serves several purposes. It causes the cellophane film to be a water vapor barrier film for packaging purposes where either a loss of or gain in water content of the product would render the product less attractive for sale. In addition, the coating promotes retention of water (which acts as a plasticizer usually along with some glycol or glycerine) in the cellophane, thus helping to prevent brittle fracture of the film. Finally, such coatings provide a heat sealable outer coating whereas uncoated cellophane, by its very nature, cannot be heat sealed.

For manufacturers concerned with applying such thin coatings to substrates such as cellophane, the solubility of a polymer in a solvent and the water vapor transmission rate (WVTR) of a coated substrate are particularly important properties. Usually the desired properties include as low a WVTR as possible coupled with low temperature solubility of the polymer in an inexpensive solvent or solvent mixture. These of course represent only a few criteria. For example, the decision of which resin to use may depend upon other factors such as heat seal temperature, appearance, adhesion to the cellophane, etc. As a starting point, however, WVTR and solubility are of primary importance.

The WVTR of vinylidene chloride interpolymers is directly related to the mole percent of vinylidene chloride in the interpolymer. Therefore, it is generally advantageous to get the mole percent of vinylidene chloride as high as possible consistent with solubility in one or more desired organic solvent systems. A high vinylidene chloride content generally means that strong crystallizing forces are present in the interpolymer. It is known that highly crystalline polymers are poorly soluble. Therefore, these two factors, low solubility and high vinylidene chloride content, are diametrically opposed.

As the mole percent of vinylidene chloride is raised in an interpolymer series, it is obvious that a mole percentage range is reached where the interpolymers rapidly change from interpolymers which crystallize slowly, are amorphous and dissolve readily, to interpolymers which crystallize rapidly, are highly crystalline and are much more difficult to dissolve. It also becomes obvious that, in the mole percentage range where the interpolymers rapidly change, a small amount of interpolymeric composition variation in the direction of a higher vinylidene chloride content in the interpolymer than intended can result in interpolymers unsuitable for coating purposes. Such interpolymers are unsuitable either because they fail to dissolve adequately in a solvent system or because they crystallize out of solution after initially dissolving in a solvent system. The beginning of a tendency to be unsuitable may be measured by light transmission measurements of lacquer solutions of an interpolymer in a solvent system using an instrument such as a visible light spectrometer. Careful control of solution turbidity, hereinafter called "haze", as measured in terms of percent light transmission is essential to use of these interpolymers for coating purposes. Careful control is especially critical when preparing high mole percent vinylidene chloride interpolymers. It is believed that tiny insoluble crystals which remain after dissolving act as nuclei for formation of overall crystal structures once the interpolymer has been deposited as a thin coating on a substrate. The rate of crystallization is affected by the number of nuclei present. It has been found that excessively slow crystallization rates result in "blocking" during machine operations when a coated film is wound in large rolls before crystallization is generally complete. "Blocking", as used herein, is the tendency of the interpolymer coating to adhere to another coated layer. When blocking is particularly severe, it is generally not possible to unwind a roll of coated film.

It is possible by judicious choice of comonomers and proper reaction methods to optimize the WVTR-solubility relationship and to approach an ideal composition for use. A great amount of work has been done in the past to find such compositions. Substantial effort has also been expended to find the best method of preparing these compositions to give the best combination of WVTR and solubility. A combination of choice of monomers and method of polymerization thereof has now been discovered which is believed to be superior to anything known heretofore for attainment of optimum combined barrier and solubility properties.

The primary object of the present invention is to provide an improved method for preparing interpolymers having polymerized therein vinylidene chloride, methyl methacrylate, itaconic acid and a comonomer selected from the group consisting of acrylonitrile, methacrylic acid and methacrylonitrile. The interpolymers prepared in accordance with the improved method should have a high vinylidene chloride content, a narrow composition range, and enhanced solubility in organic solvents. The interpolymers should also provide a low permeability to moisture and to oxygen. The interpolymers should further provide a good crystallization rate for a film cast from an interpolymer solution.

Still further objects and advantages will appear in the more detailed description and examples set forth below. It is to be understood, however, that the more detailed description and examples are given by way of illustration only, and not by way of limitation. Various changes may be made by those skilled in the art without departing from the scope and spirit of the present invention.

SUMMARY OF THE INVENTION

It has now surprisingly been found that interpolymers, having polymerized therein vinylidene chloride, methyl methacrylate, itaconic acid and a comonomer selected from the group consisting of acrylonitrile, methacrylic acid and methacrylonitrile, which have a high vinylidene chloride content result from a process for preparing, in aqueous emulsion, controlled interpolymer compositions having polymerized therein (a) from about 86 to about 92 mole percent vinylidene chloride; (b) from about 14 to about 8 mole percent of a mixture of methyl methacrylate and a comonomer selected from the group consisting of acrylonitrile, methacrylic acid and methacrylonitrile, said mixture of methyl methacrylate and the comonomer having a molar ratio of the comonomer to methyl methacrylate of from about 0.2:1 to 5:1; and (c) from about 0.5 to about 1.0 weight percent itaconic acid based on weight of (a) plus (b); said interpolymer compositions having a relative viscosity of from about 1.3 to about 1.7 at 25° C. as a 1 percent solution in tetrahydrofuran; said interpolymer compositions being capable of forming generally haze-free solutions when present in an amount of about 20 percent solids in a solvent mixture, said solvent mixture comprising about 65 weight percent tetrahydrofuran, based on solvent mixture weight, and about 35 weight percent toluene, based on solvent mixture weight, said process comprising the sequential steps of:

(A) initiating emulsion polymerization by forming a seed latex, the seed latex being formed in a batch emulsion polymerization process which comprises:
(1) adding a first monomer charge to an aqueous emulsion polymerization medium, the first monomer charge comprising from about 3 to about 8 weight percent of a principal mixture of monomers, the principal mixture of monomers comprising from about 86 to about 92 mole percent vinylidene chloride and from about 14 to about 8 mole percent of a comonomer mixture of methyl methacrylate and a comonomer selected from the group consisting of acrylonitrile, methacrylic acid and methacrylonitrile, said comonomer mixture having a molar ratio of the comonomer to methyl methacrylate of from about 0.2:1 to about 5:1, the polymerization medium comprising water, an emulsifier and from about 0.5 to about 1.0 weight percent itaconic acid based on the principal mixture of monomers;
(2) adding a polymerization initiator to said emulsion polymerization medium, the initiator being added at a generally constant rate;
(3) continuing seed latex formation under autogenous pressure until a pressure drop in vapor pressure of monomers in the polymerization medium of from about 1.8 to about 2.2 pounds per square inch occurs;

(B) continuing polymerization under autogenous pressure by adding to the emulsion polymerization medium:
(1) a second monomer charge in an amount between about 85 and 92 weight percent of the principal mixture of monomers as in (A)(1), said second monomer charge being added at a generally constant rate, the rate being sufficient to continually provide an excess of unreacted monomers in the polymerization medium, said excess being generally from about 2 to about 10 weight percent based on weight of the polymerization medium; and
(2) the polymerization initiator at generally the same constant rate of addition as in (A)(2); and (C) generally immediately following addition of all of the second monomer charge, finishing polymerization in a predetermined time interval T, the time interval T having at least a first portion and a second portion, by:
(1) continuing to add the polymerization initiator at generally the same constant rate of addition as in (A)(2) and (B)(2), the initiator being added throughout the time interval T; and
(2) adding a third monomer charge in an amount between about 2 and 12 weight percent of the principal mixture of monomers as in (A)(1), said third monomer charge being added over the first portion of the time interval T in such a manner that the vapor pressure of monomers in the emulsion polymerization medium is reduced smoothly as reflected by a time-pressure curve wherein time is plotted on the abscissa and pressure is plotted on the ordinate, the time-pressure curve being generally free of discontinuities from the beginning of the time interval T to the end thereof and having a shape, the shape being that of a line which is generally concave downward.

Also within the scope of the present invention are the polymers prepared in accordance with the aforementioned process.

Further contemplated as being within the scope of the present invention is a crystalline, controlled composition interpolymer having polymerized therein (a) from about 86 to about 92 mole percent vinylidene chloride; (b) from about 14 to about 8 mole percent of a comonomer mixture of methyl methacrylate and a comonomer selected from the group consisting of acrylonitrile, methacrylic acid and methacrylonitrile, said comonomer mixture having a molar ratio of the comonomer to methyl methacrylate of from about 0.5:1 to 2:1; and (c) from about 0.5 to about 1.0 weight percent itaconic acid based on weight of (a) plus (b); said interpolymer having a relative viscosity of from about 1.3 to about 1.7 at 25° C. as a 1 percent solution in tetrahydrofuran; said interpolymer being capable of forming generally haze-free solutions when present in an amount of about 20 percent solids in a solvent mixture as measured in terms of at least 80 percent transmission of the solution using an ultraviolet spectrophotometer operating at a wavelength of 640 nanometers against a reference of pure solvent mixture after aging the solution at 25° C. for a period of 24 hours, said solvent mixture comprising about 65 weight percent tetrahydrofuran, based on solvent mixture weight, and about 35 weight percent toluene, based on solvent mixture weight.

DETAILED DESCRIPTION OF THE DRAWINGS

Figure 1:
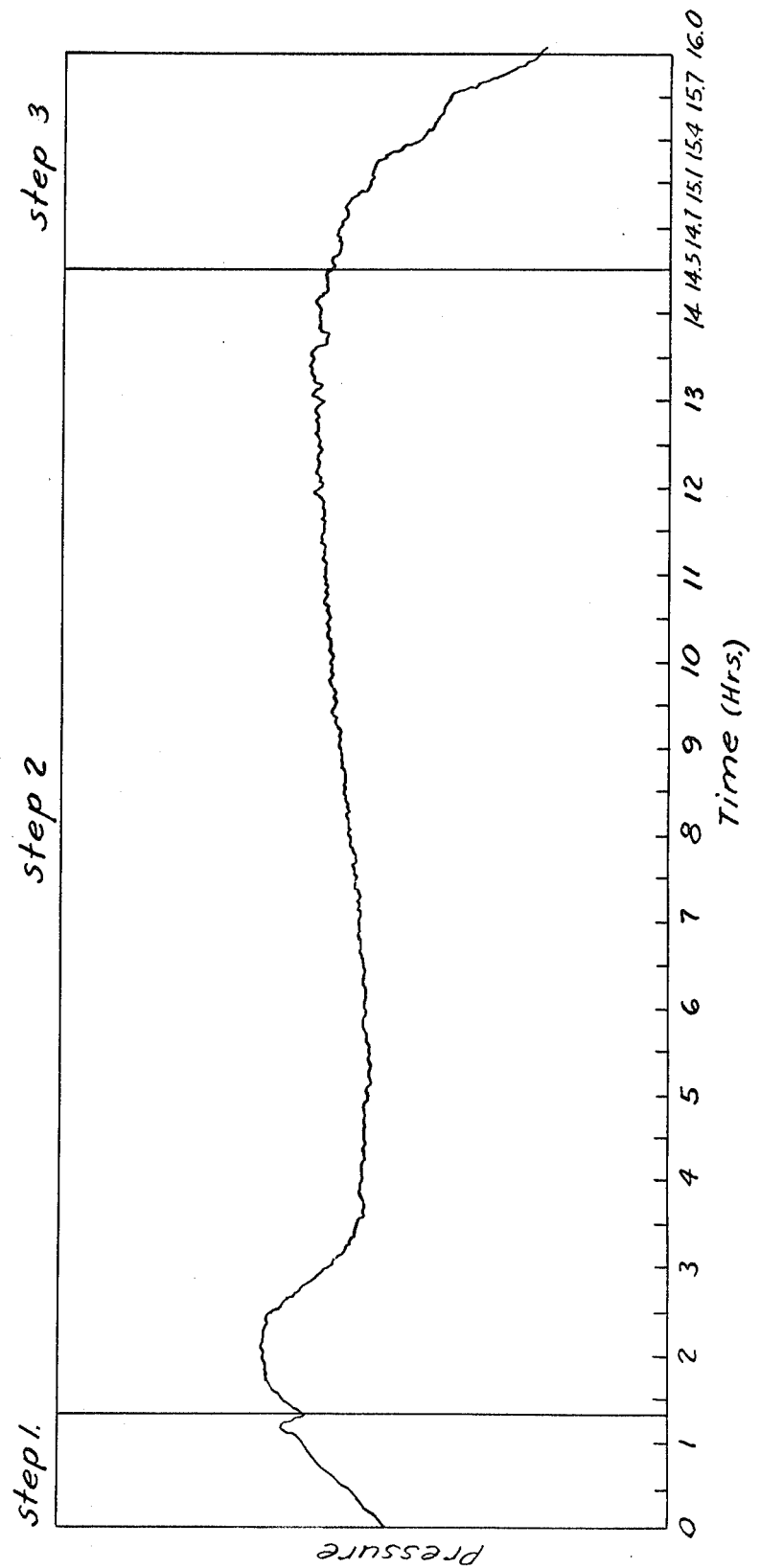
FIGS. 1 and 2 are time-pressure curves.
Figure 2:
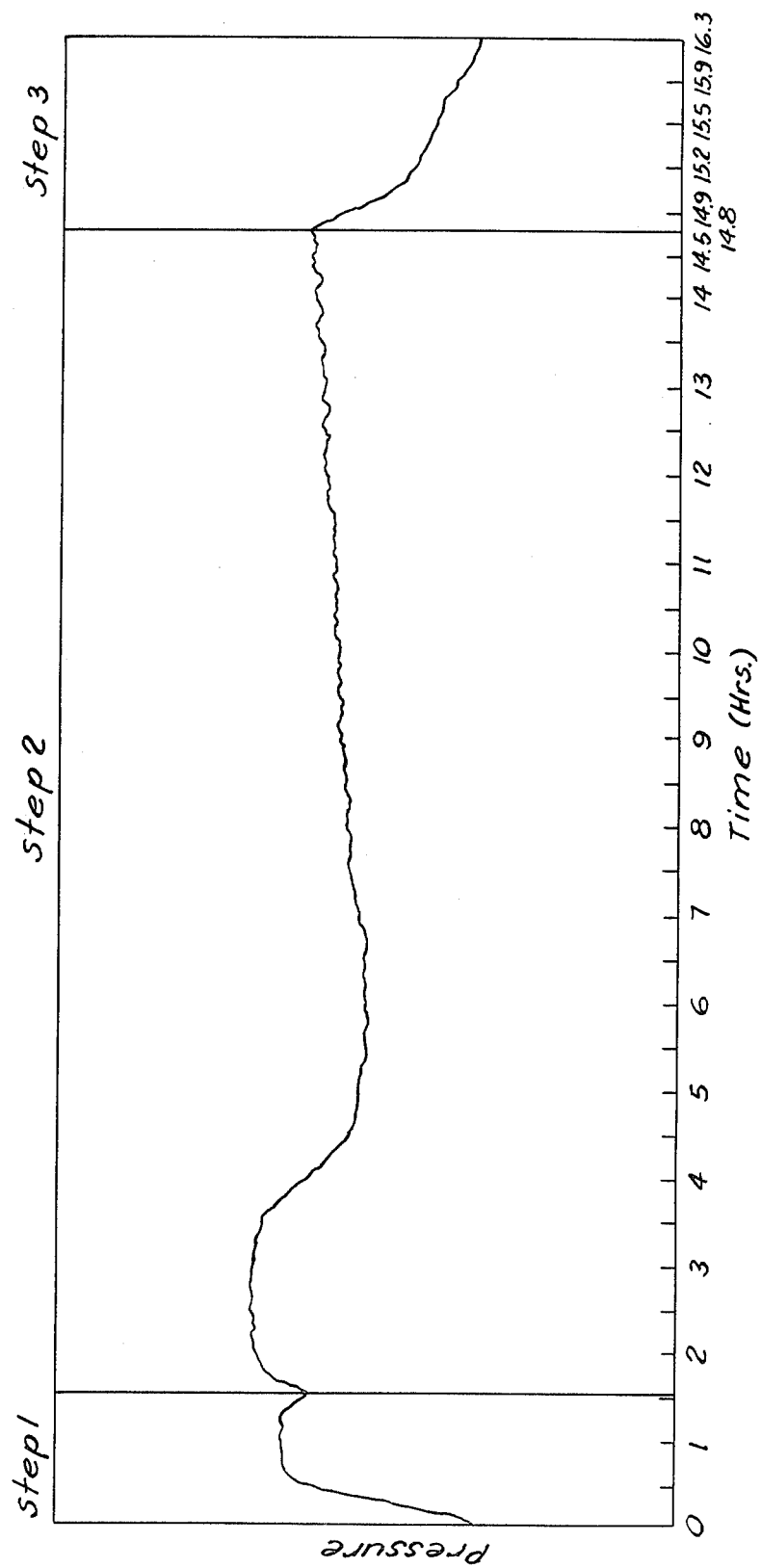

FIGS. 1 and 2 are time-pressure curves which reflects vapor pressure of monomers in the reactor as a function of time. FIG. 1 is a partial reproduction of a chart of pressure transducer readings taken during the polymerization of monomers in Example 1, Experiment A. FIG. 2 is a partial reproduction of a chart of pressure transducer readings taken during the polymerization of monomers in Example 2, Experiment D. In FIGS. 1 and 2, the vertical axis represents pressure and the horizontal axis reflects time in hours. The horizontal axis in FIGS. 1 and 2 is not a straight linear progression but contains a portion where the time scale is expanded. Steps I, II and III of the polymerization processes represented by FIGS. 1 and 2 are so labeled on FIGS. 1 and 2. The charts of pressure transducer readings of FIGS. 1 and 2 are generally smooth lines. The lines do, however, contain minor variations which result in a "sawtooth" appearance. Persons skilled in the art will recognize that such variations are usually normal for polymerization apparatus wherein there is a time lag between a temperature increase and a response by a cooling medium control. Persons skilled in the art will also recognize that more sophisticated control apparatus will minimize temperature variation which will, in turn, minimize variations in pressure readings as reflected by the lines.

DESCRIPTION OF THE PREFERRED EMBODIMENTS

As previously indicated, the monomeric materials are polymerized in an aqueous emulsion to form interpolymers having polymerized therein from about 86 to about 92 mole percent vinylidene chloride, from about 14 to about 8 mole percent of a mixture of methyl methacrylate and a comonomer selected from the group consisting of acrylonitrile, methacrylic acid and methacrylonitrile, and from about 0.5 to about 1.0 weight percent itaconic acid based on combined weight of vinylidene chloride, methyl methacrylate and the comonomer. The monomeric materials are polymerized using a three step process. Step I focuses on the formation of a seed latex. A first monomer charge of from about 3 to about 8 weight percent of a principal mixture of monomers is added during Step I. The principal mixture of monomers comprises from about 86 to about 92 mole percent vinylidene chloride, and from about 14 to about 8 mole percent of a comonomer mixture of methyl methacrylate and a comonomer selected from the group consisting of acrylonitrile, methacrylic acid and methacrylonitrile. The comonomer mixture has a molar ratio of the comonomer to methyl methacrylate of from about 0.2:1 to 5:1. Step II focuses on the simultaneous and continuous addition of monomers. A second monomer charge of from about 85 to about 92 weight percent of the principal mixture of monomers is added during Step II. A portion of the principal mixture of monomers must remain after the Steps I and II to be added as a third monomer charge. Step III focuses on finishing polymerization. The third monomer charge, or from about 2 to about 12 weight percent of the principal mixture of monomers, is added according to a monomer feeding schedule. The schedule calls for the third monomer charge to be added in at least two incremental steps. A polymerization initiator is added at a generally constant rate throughout Steps I, II and III.

Step I is essentially a small batch polymerization. In a batch polymerization, polymer composition is likely to vary because of unequal reactivity ratios among the monomers. Therefore, it is essential that Step II be started as soon as the seed latex shows any signs of polymer composition variation. Persons skilled in the art will recognize that an indicator of such a variation is a pressure drop in the free space above such a reaction mixture when the reaction mixture is contained in a polymerization apparatus. The pressure drop is a drop in vapor pressure of monomers in the reaction mixture. If the transition from Step I to Step II is late, e.g., after a pressure drop of more than about 1.8 to about 2.2 pounds per square inch, enough polymer composition change may occur to produce an unsatisfactory interpolymer. Unsatisfactory interpolymers are those which are either insoluble, or which, although soluble, yield solutions having unsatisfactory haze values.

With regard to Step II, prior known processes for preparing interpolymers of this general type (e.g., the process of U.S. Pat. No. 3,879,359) require that the monomers be added to the polymerization reaction medium, in the proper ratios, as fast as they are polymerized. As such, there is generally very little excess monomer present at any time within the polymerization medium. The processes are disclosed as being critical for preventing polymer composition change. The composition change is generally accompanied by a resultant loss in WVTR and solubility characteristics. In another process, the monomers must be added in two stages during the second step. In a first stage, the monomers must be added at a rate sufficient to continually provide an excess of monomers in the polymerization medium. In a second stage, remaining monomers must be added at a rate sufficient to continually ensure an absence of excess monomers in the polymerization medium. The latter process is disclosed as being critical for providing coatings having adequate flexibility.

It has now been unexpectedly found that interpolymers having the combination of properties required by the present invention are formed when from about 85 to about 92 percent of the total monomeric materials, excluding the itaconic acid, is added in a generally constant ratio and at a generally constant rate throughout Step II. The generally constant rate must be sufficient to provide an excess, or a reservoir, of unreacted monomers in the polymerization medium of no more than about 10, and no less than about 1, weight percent based on weight of the polymerization medium. Persons skilled in the art will recognize that the reservoir of unreacted monomer is generally greatest near the beginning of Step II and least near the end of Step II.

With regard to Step III, prior known processes for preparing interpolymers of this general type (e.g., the process of U.S. Pat. No. 3,879,359) require that the polymerization reaction be continued after all monomers have been added until about a 50 percent drop in reaction pressure occurs. Generally, immediately thereafter the reaction medium must be cooled and the unreacted monomer removed. This process is disclosed as providing the closest known control of copolymer composition change in a batch system. Such process is further disclosed as providing the minimum WVTR and maximum resin solubility when properly carried out. A second process requires the addition of two components to the polymerization medium generally immediately after the addition of all of the monomer mixture. The two components are an ethylenically unsaturated comonomer and a polymerization initiator. This process is disclosed as preventing undesirable interpolymer composition change.

It has now been unexpectedly found that interpolymers having the combination of properties required by the present invention are formed when a portion of the principal mixture of monomers is added during Step III. The portion is from about two to about twelve weight percent based on the principal mixture of monomers. Persons skilled in the art will recognize that in a polymerization apparatus used in an emulsion polymerization, there is generally a free space above the polymerization medium. Such persons will also recognize that at the end of the second step (Step II), an amount of unreacted monomers remains. Those skilled in the art will further recognize that said amount of unreacted monomers exerts a pressure upon the free space above the polymerization medium. It is believed that it is generally desirable to reduce the pressure in the free space above the polymerization medium prior to opening the polymerization apparatus to extract the interpolymer. One technique which may be used to reduce the pressure in the free space is to polymerize a large portion of the remaining monomers. It has been found that, by stopping monomer addition at the end of Step II and thereafter allowing the remaining monomers to polymerize by adding additional polymerization initiator, sufficient polymer composition variation occurs to render an interpolymer recovered after the pressure is reduced by consumption of monomers generally insoluble at high levels of vinylidene chloride. By monitoring the vapor pressure of monomers in the free space above the polymerization medium, it has been found that the vapor pressure decreases very rapidly after monomer addition is stopped at the end of Step II. It has now unexpectedly been found that, by incrementally reducing the rate of monomer addition of the third monomer charge from the rate of monomer addition during Step II in at least two incremental steps while maintaining the rate of initiator addition, the vapor pressure of monomers in the free space decreases gradually.

An interpolymer produced by incrementally reducing the rate of monomer addition during Step III is surprisingly soluble when compared to an interpolymer of generally identical composition prepared in the same manner except that monomer addition is stopped at the end of Step II. A time-pressure curve representing the polymerization wherein monomer addition is stopped at the end of Step II has a characteristic shape representing Step III. Said characteristic shape is that of a line which is generally concave upward when pressure is plotted on the ordinate and time is plotted on the abscissa. By way of contrast, a time-pressure curve for Step III when monomer addition is incrementally reduced is generally concave downward when pressure is plotted on the ordinate and time is plotted on the abscissa. See FIG. 1 for an illustration of the latter time-pressure curve. See FIG. 2 for an illustration of the former time-pressure curve.

Step III continues for a time interval T. The time interval T varies in accordance with (1) the interpolymer which is being polymerized and (2) the amount and ratio of mixed monomers remaining at the end of the second step. Desirable results have been obtained with a time interval T of about 1½ hours. Persons skilled in the art will recognize that satisfactory results are obtained when the time interval T is other than 1½ hours. As such, the time interval of 1½ hours is not to be taken by way of limitation.

It has been found that suitable results are obtained when a first incremental step and a second incremental step are used to reduce the rate of monomer addition during Step III from that of Step II. In the first incremental step, a first reduced rate of addition is maintained for a first fractional part of the time interval T. The first reduced rate of addition must be less than the rate of monomer addition during the second step, or Step II. In the second incremental step, a second reduced rate of addition is maintained for a second fractional part of the time interval T. The second reduced rate of addition must be less than the first reduced rate of addition. Persons skilled in the art will recognize that more than two incremental reductions in the rate of monomer addition from the rate of monomer addition during Step II may be made. As such, two incremental steps are not to be taken by way of limitation. Beneficial results are obtained when the time interval T also has a third fractional part wherein only the polymerization initiator is added to the polymerization medium. Desirable results are obtained when: (1) the first fractional part of the time interval T is about T/6; (2) the second fractional part of the time interval T is about T/3; (3) the third fractional part of the time interval T is about T/2; (4) the first reduced rate of addition is about one-half the rate of monomer addition of Step II; and (5) the second reduced rate of addition is about one-fourth the rate of monomer addition of Step II.

The three step polymerization technique is necessary to provide satisfactory interpolymers in accordance with the present invention. It has now unexpectedly found that interpolymers having the same general composition as those of the present invention but which are produced without adding a portion of the principal mixture of monomers during Step III are unsatisfactory for purposes of the present invention. Such interpolymers are unsatisfactory either because of poor solubility or because of excessive haze. It is believed that such unsatisfactory results arise from the formation of too much high vinylidene chloride content interpolymer during Step III.

Interpolymers containing from about 86 to about 92 mole percent vinylidene chloride may also be produced by a conventional batch emulsion polymerization. In a conventional batch emulsion polymerization, all of the monomers to be polymerized are added at the start of polymerization. It has been found, however, that such interpolymers are generally not sufficiently soluble in low cost solvents to provide useful coatings for substrates such as cellophane.

Persons skilled in the art will recognize that each of the monomeric materials polymerized to form the interpolymers of the present invention has a characteristic reactivity ratio with respect to each of the other monomeric materials. Such characteristic reactivity ratios are well known in the art. In general, it is believed that methyl methacrylate and the comonomer which is selected from the group consisting of acrylonitrile, methacrylic acid and methacrylonitrile both enter the interpolymer faster than vinylidene chloride. It is further believed that itaconic acid enters the interpolymer slower than vinylidene chloride. Accordingly, the present invention requires that all of the itaconic acid be added during Step I rather than added in the same manner as the primary mixture of monomers. Because of the differing reactivity ratios, it is believed that the vinylidene chloride content of the interpolymer increases as the emulsion polymerization proceeds toward completion. At some point as the vinylidene chloride content of the interpolymer increases, the interpolymer ceases to be soluble in a given solvent system. A typical solvent system is a mixture of tetrahydrofuran and toluene in a weight ratio of 65/35. Insolubility of an interpolymer, which initially dissolves in a solvent system, manifests itself as crystallization of the interpolymer out of solution. The crystallization causes the solution to be hazy. Persons skilled in the art will recognize that the interpolymer composition at which the onset of insolubility occurs varies with solvent strength. There will be, however, a threshold level at which solutions of the interpolymer are not stable. This threshold may be called the "haze threshold".

Beneficially, the interpolymers prepared by the present invention do not develop hazy solutions upon standing for 24 hours at 25° Centigrade (°C.) after dissolving for a period of about 30 minutes in a solvent system which is maintained at a temperature of about 30° C. Desirably, the interpolymers prepared in accordance with the present invention are capable of forming generally haze-free solutions when present in an amount of from about 5 to about 20 weight percent solids based on weight of solids plus solvent. The solvent system is desirably a blend of tetrahydrofuran and toluene in a weight ratio of tetrahydrofuran to toluene of about 65/35. Such generally haze-free solutions desirably have a haze value of at least 80 percent transmission. Haze values are measured in terms of percent transmission of visible light of the solution, after the solution has been aged for a period of 24 hours at a temperature of 25° C., against a reference of the solvent system. Haze values may be obtained by using an ultraviolet spectrophotometer operating at a wavelength of 640 nanometers. Preferably, such generally haze-free solutions have a haze value of at least 85 percent transmission.

The interpolymers prepared in accordance with the present invention beneficially have a relative viscosity of from about 1.3 to about 1.7 at 25° C. as a 1 percent solution in tetrahydrofuran. Said interpolymers beneficially have the following properties when deposited as a coating with a coating weight of 4 grams per square meter: (a) a minimum heat seal temperature of from about 70° C. to about 140° C.; (b) a water vapor transmission rate of no greater than about 0.25 grams/100 square inches/24 hours at 38° C.; (c) an oxygen transmission rate of no greater than about 0.30 cubic centimeters of oxygen/100 square inches/24 hours/1 atmosphere of oxygen at 25° C.; (d) a crystallization ratio at 15 minutes at 80° C. of from about 0.5 to about 2. The interpolymers desirably have a minimum heat seal temperature of from about 95° C. to about 130° C. when deposited as a coating with a coating weight of 4 grams per square meter.

The interpolymers of the present invention are prepared from a mixture of monomers. The mixture of monomers desirably comprises a principal mixture of monomers and an amount of itaconic acid. The principal mixture of monomers comprises from about 86 to about 92 mole percent vinylidene chloride and from about 14 to about 8 mole percent of a comonomer mixture of methyl methacrylate and a comonomer selected from the group consisting of acrylonitrile, methacrylic acid and methacrylonitrile. The amount of itaconic acid is and from about 0.5 to about 1.0 weight percent itaconic acid based on the principal mixture of monomers. The comonomer mixture has a molar ratio of the comonomer to methyl methacrylate of from about 0.2:1 to 5:1. Interpolymers containing less than about 0.5 weight percent itaconic acid are believed to provide inadequate coating adhesion when the interpolymer is applied as a lacquer coating to a substrate such as cellophane. Amounts of itaconic acid in excess of about 1.0 weight percent based on the primary mixture of monomers may be used. However, such amounts are not required for sufficient adhesion. Amounts in excess of 1.0 weight percent are accordingly uneconomical.

It has been found that over a short time interval during Step II, the reservoir of unreacted monomers in the polymerization medium shifts rapidly from a high level to a low level. The high level is about 10 weight percent based on weight of the polymerization medium. The low level is from about 1 to about 2 weight percent based on weight of the polymerization medium. The short time interval will hereinafter be referred to as the shift interval. Placement of the shift interval within Step II depends upon a number of factors. Such factors include: (1) amount of latex solids; (2) desired interpolymer molecular weight; and (3) desired interpolymer solution viscosity. Desirably, the amount of latex solids to be produced is in the range of from about 50 to about 56 weight percent based on weight of the latex. The amount of latex soids is advantageously obtained in an emulsion polymerization which lasts for a polymerization interval. The polymerization interval is measured from the beginning of Step I to the end of Step III. Desirable polymerization intervals are in the range of from about 5 to about 20 hours. Persons skilled in the art will recognize that polymerization intervals are generally selected based on a number of interrelated factors. Illustrative factors include, but are not limited to, economic guidelines and a need to remove heat from the polymerization medium. Polymerization intervals of less than about 5 hours may be used. However, such intervals may require the use of complex cooling apparatus. Polymerization intervals of more than about 20 hours are possible. However, such intervals are usually uneconomical.

In Step I, the emulsion polymerization medium is beneficially heated to a temperature in the range of from about 30° to about 80° C. The emulsion polymerization medium is desirably heated to a temperature in the range of from about 50° to about 60° C. Preferably, the emulsion polymerization medium is heated to a temperature of about 50° C. In Steps II and III, polymerization is respectively continued and finished at a temperature beneficially within the range of from about 30° to about 80° C. Desirably, the temperature during Steps II and III is within the range of from about 50° to about 60° C. Persons skilled in the art will recognize that temperature is but one of many polymerization variables which should be controlled to ensure production of a consistent interpolymer product. Persons skilled in the art will also recognize that temperature control is more critical when using thermal initiation rather than a conventional reduction-oxidation emulsion polymerization initiator. Beneficial results are obtained when polymerization temperatures are maintained within a tolerance of ±0.5° C.

The previously stated temperature limitations for each of the three steps of the process of the present invention are believed to be important. It is believed that if the shift interval occurs too early during Step II, an interpolymer which is too soluble will be produced. That is, the interpolymer will not crystallize. It is also believed that if the shift interval occurs too late during Step II an interpolymer which is generally insoluble will be produced. A desirable time interval for Step II is in the range of from about 4 to about 15 hours.

It is to be understood that conventional amounts and types of emulsifiers and other additives may be used in preparing the interpolymers of the present invention. Such emulsifiers and other additives must not interfere with, or significantly alter, the reaction mechanism or the final interpolymer prescribed herein. It is also to be understood that small amounts of other monomeric materials may be added before, during, or after the prescribed polymerization reaction. Such other monomeric materials must not interfere with, or significantly alter, the reaction mechanism or the final interpolymer prescribed herein.

Conventional amounts of reduction-oxidation (hereinafter "redox") initiators may be used in preparing the interpolymers of the present invention. A preferred redox initiator is t-butyl hydroperoxide/sodium formaldehyde sulfoxylate mixture wherein the sodium formaldehyde sulfoxylate is generally added in excess. The amount of emulsion polymerization initiator which is used varies over a broad range and depends largely upon the type and concentration of the initiator as well as the desired interpolymer molecular weight. As noted above, the emulsion polymerization initiator is desirably added at a generally constant rate throughout the emulsion polymerization. The generally constant rate must be sufficient to produce interpolymers in accordance with the present invention.

The following examples, wherein all parts and percentages are by weight unless otherwise stated, illustrate the present invention. The examples are not to be construed as limiting the scope of the present invention.

EXAMPLE 1

A. Preparation of Vinylidene Chloride (VDC)/Methyl Methacrylate (MMA)/Methacrylic Acid (MAA)/Itaconic Acid (IA) Interpolymer According to the Present Invention A VDC/MMA/MAA/IA interpolymer was prepared by emulsion polymerization in a 3-liter glass pipe reactor equipped with an agitator and metering pumps.

Step I - Initiating Polymerization

The initial water phase charged to the reactor was as follows:

1425 grams of deionized water
18 grams emulsifier (80% active) (a dihexyl ester of sodium sulfo-succinic acid commercially available under the trade designation Aerosol MA from American Cyanamid Company.
13 grams itaconic acid (.70 weight % based on the total weight of the VDC/MMA/MAA monomer mixture added during polymerization)

The initial water phase was added to the reactor. The reactor was then evacuated, purged with gaseous nitrogen and evacuated a second time.

A monomer mixture comprising the following ingredients was prepared:

1898 grams (90 mole %) VDC
109 grams (5 mole %) MMA
92 grams (5 mole %) MMA

An oxidizing solution was prepared by diluting 11.1 grams of 7 percent t-butyl hydroperoxide (TBHP) to 500 grams with deionized water. A reducing solution was similarly prepared by diluting 4.1 grams of sodium formaldehyde sulfoxylate to 500 grams with deionized water.

Folowing the second evacuation of the reactor, the reactor was heated to a temperature of about 55° C. while stirring at a rate of about 250 revolutions per minute (rpm). The rate of stirring was maintained at about 250 rpm throughout all three steps. About 73 grams of the monomer mixture was then pumped into the reactor as rapidly as possible. Addition of the oxidizing and reducing solutions was then started. The oxidizing and reducing solutions were each added by pumping, through separate pumps, at a rate of about 10 grams per hour. As such, the oxidizing and reducing solutions were mixed in the reactor. The seed atex reaction was allowed to proceed until there was a drop in pressure from the maximum pressure attained during Step I of about 2 pounds per square inch (psi). Step I lasted for an interval, beginning with addition of the oxidizing and reducing solutions and ending with the drop in pressure of about 2 psi, of about one hour.

Step II - Continuous Addition

Generally, immediately following the 2 psi pressure drop, addition of the monomer mixture was started at a rate of about 130 grams per hour. The 130 gram per hour rate of addition was maintained for about 13¼ hours. As such, a total of about 1722 grams of the monomer mixture was added during Step II. Addition of the oxidizing and reducing solutions, each at a rate of about 10 grams per hour, was continued throughout Step II.

Step III - Finishing

Generally, immediately following completion of monomer mixture addition in Step II, finishing was started. In Step III, the monomer mixture was added in accordance with the following schedule:

(1) addition of monomer mixture at a rate of about 65 grams/hour for ¼ hour; and (2) addition of monomer mixture at a rate of about 32 grams/hour for ½ hour. Addition of the oxidizing and reducing solutions, each at a rate of about 10 grams per hour, was continued throughout Step III. Step III lasted for an additional ¾ hour after completion of monomer mixture addition. As such, Step III lasted for about 1½ hours.

At the end of Step III, addition of the oxidizing and reducing solutions was stopped. The reactor was then cooled to ambient temperature. The latex was then recovered as detailed below.

B. Recovery of the Polymer from the Latex

The interpolymer was recovered from the latex by coagulation in calcium chloride ($CaCl_2$). 35 Cubic centimeters (cc) of a 32% $CaCl_2$ solution were added to 1000 cc of water to form a solution. The solution was then heated to a temperature of about 40° C. Thereafter 200 cc of the latex produced in (A) above were added to the mixture with stirring at a rate of about 250 rpm. An additional amount of 1000 cc of water was then added to the mixture. The mixture was then slowly heated to a temperature of about 80° C. and held at that temperature for about 2 hours while continuing stirring at a rate of about 250 rpm. The slurry was then quenched with ice. The polymer was collected and washed with a spray of water for 10 minutes in a centrifuge. The interpolymer was then dried to a powder form containing less than about 2% water. The interpolymer was then ready for evaluation.

C. Test for Solubility of the Interpolymer (Haze Stability)

The haze or tubidity of 19.5 percent interpolymer solids in a 65/35 weight ratio tetrahydrofuran/toluene (THF/Tol) solvent mixture was measured using a Beckman Model 25 Ultraviolet Spectrophotometer at a wavelength of 640 nanometers (nm). Haze values are reported as percent transmission. The lower the transmission value, the more turbid or hazy the solution.

D. Testing Coating Performance

1. Preparation of coated film

Coating tests were conducted on an oriented polyester film. The film was coated with a 19.5 percent interpolymer solids lacquer solution using a 65/35 weight ratio THF/Tol mixture as the solvent. The coating weight was about 4 grams/square meter. The coated film was aged for 16 hours at a temperature of 60° C. to ensure development of crystallinity before testing the coating.

2. Measuring permeability to water vapor

Permeability to water vapor (WVTR) was measured using an infrared diffusometer, commercially available from Reigel-Mocon Modern Controls under the designation Model IRD-2. The data are reported as grams of water per 100 squares inches per 24 hours at 38° C. for a coating weight of 4 grams per square meter.

3. Testing for minimum heat seal temperature

A Robot automatic controlled, air operated jaw sealer was used for making seals so that minimum heat seal temperature (MHST) could be measured. Heat seals were made at 5 degree intervals between 95° C. and 135° C. using 20 psi jaw pressure and dwell time of 1 second. The MHST is the temperature at which coating deformation is first observed when the seal is torn apart.

4. Measuring permeability to oxygen

Permeability to oxygen ($O_2TR$) was measured using an oxygen diffusometer commercially available from Reigel-Mocon Modern Controls under the designation Oxtran Model 1050. The data are reported as cubic centimeters (cc) of oxygen per 100 square inches per 24 hours per one atmosphere of oxygen at 25° C. for the coating weight of 4 grams per square meter.

5. Determining the crystallization ratio at 15 minutes at 80° C.

A 15 percent solution of the interpolymer in a solvent mixture of tetrahydrofuran and toluene (THF/tol) in a respective weight ratio of 65/35 was prepared by stirring the interpolymer in the solvent mixture for 30 minutes at 30° C. Crystallization of a coating prepared from the solution was monitored by casting a film from the solution onto a 0.5 mil tetrafluoroethylene film directly in the beam of a recording infrared spectrophotometer using a coating apparatus generally identical to that described in U.S. Pat. No. 3,220,378. The spectrophotometer was a Beckman Model 4240 commerically available from Beckman Instruments, Inc. The coated film was maintained at a temperature of about 80° C. throughout the procedure described herein. An infrared absorption band of 1045 $cm^{-1}$ is characteristic of crystalline vinylidene chloride interpolymers. Intensity of the 1045 $cm^{-1}$ absorption band was monitored with time to yield a crystallization rate curve and a value for change in optical density at 1045 $cm^{-1}$. The change in optical density at 1045 $cm^{-1}$ as a result of crystallization is divided by a correction factor. The correction factor is the difference between an optical density value for the coated film at 1410 $cm^{-1}$ and an optical density value for the coated film at 1520 $cm^{-1}$. The correction factor is an approximate correction factor for coating thickness. Data reported in Tables I and II was thus determined in accordance with the following formula:

$$\text{Crystallization ratio at 15 minutes at 80° C.} = \frac{\text{Optical density at 1045 } cm^{-1} \text{ at 15 minutes} - \text{Optical density at 1045 } cm^{-1} \text{ at 0 minutes}}{\text{Optical density at 1410 } cm^{-1} - \text{Optical density at 1520 } cm^{-1}}$$

6. Measuring relative viscosity of the interpolymer

Relative viscosity of the interpolymer was determined by using an Oswald viscosimeter. A one percent interpolymer solution was prepared by dissolving about ½ gram of the interpolymer in 50 milliliters of tetrahydrofuran. The one percent solution was compared to a pure sample of tetrahydrofuran in a manner wellknown in the art to determine a relative viscosity.

The following Table I sets forth the composition of the interpolymer, the relative viscosity thereof, the haze stability thereof and the minimum heat seal temperature, the WVTR, the $O_2TR$ and the crystallization ratio at 15 minutes at 80° C. of coatings prepared therefrom. For purposes of identification, the interpolymer prepared by the process detailed in part A of Example 1 is hereinafter identified as Experiment A. Two additional interpolymers were prepared and tested in generally the same manner as Experiment A. These interpolymers are identified in Table I as Experiments B and C.

TABLE I

| Experiment No. | Composition - Mole % | | | Wt % IA* | Relative Viscosity | MHST °C. | WVTR | $O_2TR$ | Solution Haze Stability as % Light Transmission | | Crystallization Ratio at 15 Minutes at 80° C. |
|---|---|---|---|---|---|---|---|---|---|---|---|
| | VDC | MMA | MAA | | | | | | Initial | 24 Hours | |
| A** | 90 | 5 | 5 | 0.7 | 1.43 | 120 | .11 | .21 | 95 | 86 | 1.17 |
| B** | 90 | 7 | 3 | 0.7 | 1.40 | 120 | .13 | .18 | 98 | 87 | 1.28 |
| C** | 90 | 6 | 4 | 0.7 | 1.46 | 120 | .11 | .16 | 95 | 80 | 1.20 |

VDC = vinylidene chloride
MMA = methyl methacrylate
MAA = methacrylic acid
IA = itaconic acid
*The amount of itaconic acid is expressed in terms of weight percent based on combined weight of vinylidene chloride, methyl methacrylate and methacrylic acid.
MHST = Minimum heat seal temperature
WVTR = Water vapor transmission rate; grams of water/100 square inches/24 hours at 38° C.; coating weight of 4 grams per square meter
$O_2TR$ = Oxygen transmission rate; cubic centimeters of oxygen/100 square inches/24 hours/one atmosphere of oxygen at 25° C.; coating weight of 4 grams per square meter.
**Illustrative of the present invention.

EXAMPLE 2 -

Comparative Vinylidene Chloride (VDC)/Methyl Methacrylate (MMA)/Methacrylic Acid (MAA)/Itaconic acid (IA) Interpolymers In each of a series of additional experiments, comparative vinylidene chloride/methyl methacrylate/methacrylic acid/itaconic acid interpolymers were prepared as per Experiment No. A of Example 1, except that monomer feed during Step II was for 13½ hours instead of 13¼ hours and monomer feeding during Step III was eliminated. Addition of the oxidizing and reducing solutions, each at a rate of 10 grams per hour, was continued throughout Steps I-III as in Example I. Step III lasted for 1½ hours as in Example 1.

The following Table II sets forth the composition of the interpolymer, the relative viscosity and haze stability thereof, and the minimum heat seal temperature (MHST), the $O_2TR$, the WVTR, and the crystallization ratio at 15 minutes at 80° C. of coatings prepared therefrom. For purposes of identification, the interpolymers prepared in accordance with Example 2 as detailed above are hereinafter identified as Experiments D, E, and F.

stability than the interpolymers prepared without following a reduced monomer feeding schedule (Examples D, E, F, G, I, K and M). Similar results are obtained with other interpolymers prepared in accordance with the present invention.

What is claimed is:

TABLE II

| Experiment No. | Composition - Mole % | | | Wt % IA* | Relative Viscosity | MHST °C. | WVTR | $O_2TR$ | Solution Haze Stability as % Light Transmission | | Crystallization Ratio at 15 Minutes at 80° C. |
|---|---|---|---|---|---|---|---|---|---|---|---|
| | VDC | MMA | MAA | | | | | | Initial | 24 Hours | |
| D | 90 | 5 | 5 | 0.7 | 1.40 | 120 | .11 | .19 | 84 | 40 | 1.02 |
| E | 90 | 7 | 3 | 0.7 | 1.58 | 120 | .16 | .18 | 88 | 50 | 1.08 |
| F | 90 | 6 | 4 | 0.7 | 1.56 | 120 | .13 | .17 | 95 | 50 | 1.28 |

VDC = vinylidene chloride
MMA = methyl methacrylate
MAA = methacrylic acid
IA = itaconic acid
*The amount of itaconic acid is expressed in terms of weight percent based on combined weight of vinylidene chloride, methyl methacrylate and methacrylic acid.
MHST = Minimum heat seal temperature
WVTR = Water vapor transmission rate; grams of water/100 square inches/24 hours at 38° C.; coating weight of 4 grams per square meter
$O_2TR$ = Oxygen transmission rate; cubic centimeters of oxygen/100 square inches/24 hours/one atmosphere of oxygen at 25° C.; coating weight of 4 grams per square meter.

EXAMPLE 3 -

Additional Experiments in which Interpolymer Composition is Varied

In a series of additional experiments, vinylidene chloride interpolymers containing either varying amounts of methacrylic acid or a comonomer other than methacrylic acid were prepared. The interpolymers were prepared either as per Experiment No. A of Example 1 (Process No. 1) or as per Experiment No. D of Example 2 (Process No. 2). The following Table III sets forth the composition of the interpolymer, the relative viscosity and haze stability thereof, and the minimum heat seal temperature (MHST), $O_2TR$, the WVTR and the crystallization ratio at 15 minutes at 80° C. of coatings prepared therefrom. For purposes of identification, the interpolymers prepared in accordance with this example are hereinafter identified as Experiments G, H, I, J, K, L, M and N.

1. A process for preparing, in aqueous emulsion, controlled interpolymer compositions having polymerized therein (a) from about 86 to about 92 mole percent vinylidene chloride; (b) from about 14 to about 8 mole percent of a mixture of methyl methacrylate and a comonomer selected from the group consisting of acrylonitrile, methacrylic acid, and methacrylonitrile, said mixture of methyl methacrylate and the comonomer having a molar ratio of the comonomer to methyl methacrylate of from about 0.2:1 to 5:1; and (c) from about 0.5 to about 1.0 weight percent itaconic acid based on weight of (a) plus (b); said interpolymer compositions having a relative viscosity of from about 1.3 to about 1.7 at 25° C. as a 1 percent solution in tetrahydrofuran; said interpolymer compositions being capable of forming generally haze-free solutions when present in an amount of about 20 percent solids in a solvent mixture, said solvent mixture comprising about 65 weight percent tetrahydrofuran based on solvent mixture weight, and

TABLE III

| Experiment No. | Composition - Mole % | | | | | Wt % IA* | Relative Viscosity | MHST °C. | WVTR | $O_2TR$ | Solution Haze Stability as % Light Transmission | | Crystallization Ratio at 15 Minutes at 80° C. |
|---|---|---|---|---|---|---|---|---|---|---|---|---|---|
| | VDC | MMA | MAA | VCN | MAN | | | | | | Initial | 24 Hours | |
| G | 89.4 | 4.7 | | 5.9 | | 0.7 | 1.48 | 125 | 0.13 | 0.21 | 91 | 30 | 2.0 |
| H** | 89.4 | 4.7 | | 5.9 | | 0.7 | 1.47 | 110 | 0.16 | 0.22 | 95 | 95 | 1.9 |
| I | 89 | 3 | | | 8 | 0.7 | 1.40 | 130 | 0.09 | 0.17 | 90 | 36 | 1.6 |
| J** | 89 | 3 | | | 8 | 0.7 | 1.40 | 130 | 0.10 | 0.21 | 98 | 83 | 1.5 |
| K | 90 | 5 | 5 | | | 0.7 | 1.40 | 120 | 0.11 | 0.19 | 84 | 40 | 1.1 |
| L** | 90 | 5 | 5 | | | 0.7 | 1.43 | 120 | 0.11 | 0.21 | 95 | 86 | 1.2 |
| M | 86 | 9 | 5 | | | 0.7 | 1.68 | 120 | 0.19 | 0.28 | 96 | 74 | 0.9 |
| N** | 86 | 9 | 5 | | | 0.7 | 1.7 | 120 | 0.21 | 0.27 | 98 | 86 | 0.7 |

VDC = vinylidene chloride;
MAA = methacrylic acid;
MMA = methyl methacrylate;
VCN = acrylonitrile;
MAN = methacrylonitrile
IA = itaconic acid
*The amount of itaconic acid is expressed in terms of weight percent based on combined weight of monomers other than itaconic acid which are polymerized into the interpolymer.
**Illustrative of the present invention.
MHST = Minimum heat seal temperature;
WVTR = Water vapor transmission rate; grams of water/100 square inches/24 hours at 38° C. with a coating weight of 4 grams per square meter;
$O_2TR$ = Oxygen transmission ratio: cubic centimeters of oxygen/100 square inches/24 hours/one atmosphere of oxygen at 25° C. with a coating weight of 4 grams per square meter.

A comparison of the data contained in Tables I, II and III clearly demonstrates that interpolymers prepared in accordance with the present invention (Examples A, B, C, H, J, L and N) have much better haze about 35 weight percent toluene based on solvent mixture weight, said process comprising the sequential steps of:

(A) initiating emulsion polymerization by forming a seed latex, the seed latex being formed in a batch emulsion polymerization process which comprises:
  (1) adding a first monomer charge to an aqueous emulsion polymerization medium, the first monomer charge comprising from about 3 to about 8 weight percent of a principal mixture of monomers, the principal mixture of monomers comprising from about 86 to about 92 mole percent vinylidene chloride and from about 14 to about 8 mole percent of a comonomer mixture of methyl methacrylate and a comonomer selected from the group consisting of acrylonitrile, methacrylic acid, and methacrylonitrile, said comonomer mixture having a molar ratio of the comonomer to methyl methacrylate of from about 0.2:1 to about 5:1, the polymerization medium comprising water, an emulsifier and from about 0.5 to about 1.0 weight percent itaconic acid based on the principal mixture of monomers;
  (2) adding a polymerization initiator to said emulsion polymerization medium, the initiator being added at a generally constant rate;
  (3) continuing seed latex formation under autogenous pressure until a pressure drop in vapor pressure of monomers in the polymerization medium of from about 1.8 to about 2.2 pounds per square inch occurs;
(B) continuing polymerization under autogenous pressure by adding to the emulsion polymerization medium:
  (1) a second monomer charge in an amount between about 85 and 92 weight percent of the principal mixture of monomers as in (A)(1), said second monomer charge being added at a generally constant rate, the rate being sufficient to continually provide an excess of unreacted monomers in the polymerization medium, said excess being generally from about 2 to about 10 weight percent based on weight of the polymerization medium; and
  (2) the polymerization initiator at generally the same constant rate of addition as in (A)(2); and
(C) generally immediately following addition of all of the second monomer charge, finishing polymerization in a predetermined time interval T, the time interval T having at least a first portion and a second portion, by:
  (1) continuing to add the polymerization initiator at generally the same constant rate of addition as in (A)(2) and (B)(2), the initiator being added throughout the time interval T; and
  (2) adding a third monomer charge in an amount between about 2 and 12 weight percent of the principal mixture of monomers as in (A)(1), said third monomer charge being added over the first portion of the time interval T in such a manner that the vapor pressure of monomers in the emulsion polymerization medium is reduced smoothly as reflected by a time-pressure curve wherein time is plotted on the abscissa and pressure is plotted on the ordinate, the time-pressure curve being generally free of discontinuities from the beginning of the time interval T to the end thereof and having a shape, the shape being that of a line which is generally concave downward.

2. The process of claim 1, wherein said interpolymer has a minimum heat-seal temperature of from about 70° C. to about 140° C. when deposited as a coating with a coating weight of about 4 grams per square meter.

3. The process of claim 1, wherein said interpolymer has a minimum heat seal temperature of from about 95° C. to about 130° C. when deposited as a coating with a coating weight of about 4 grams per square meter.

4. The process of claim 1, wherein the interpolymer, when deposited as a coating from a tetrahydrofuran lacquer solution at a coating weight of 4 grams per square meter, has a water vapor transmission rate of no greater than about 0.25 grams of water/100 square inches/24 hours at 38° C., an oxygen transmission rate of no greater than about 0.30 cubic centimeters of oxygen/100 square inches/24 hours/one atmosphere of oxygen at 25° C. and a crystallization ratio at 15 minutes at 80° C. of from about 0.5 to about 2.

5. The process of claim 1, wherein the generally haze-free solution has a haze value of at least 80 percent transmission of visible light at 640 nanometers.

6. The process of claim 1, wherein the generally haze-free solution has a haze value of at least 85 percent transmission of visible light at 640 nanometers.

7. The process of claim 1, wherein the mixture of monomers comprises about 90 mole percent vinylidene chloride and about 10 mole percent of the mixture of methacrylic acid and methyl methacrylate.

8. A process for preparing, in aqueous emulsion, controlled interpolymer compositions comprising (a) from about 86 to about 92 mole percent vinylidene chloride; (b) from about 14 to about 8 mole percent of a mixture of methyl methacrylate and a comonomer selected from the group consisting of acrylonitrile, methacrylic acid and methacrylonitrile, said mixture of methyl methacrylate and the comonomer having a molar ratio of the comonomer to methyl methacrylate of from about 0.2:1 to 5:1; and (c) from about 0.5 to about 1.0 weight percent itaconic acid based on weight of (a) plus (b); said interpolymer compositions having a relative viscosity of from about 1.3 to about 1.7 at 25° C. as a 1 percent solution in tetrahydrofuran; said interpolymer compositions having a haze value of at least 80 percent transmission of visible light at 640 nanometers when present in an amount of about 20 percent solids in a solvent mixture, said solvent mixture comprising about 65 weight percent tetrahydrofuran based on solvent mixture weight, and about 35 weight percent toluene based on solvent mixture weight; said interpolymer compositions, when deposited as a coating from a tetrahydrofuran lacquer solution at a coating weight of 4 grams per square meter, having a water vapor transmission rate of no greater than about 0.25 grams of water/100 square inches/24 hours at 38° C., an oxygen transmission rate of no greater than about 0.30 cubic centimeters/100 square inches/24 hours/one atmosphere of oxygen at 25° C., a minimum heat seal temperature of from about 95° C. to about 125° C. and a crystallization ratio at 15 minutes at 80° C. of from about 0.5 to about 2, said process comprising the sequential steps of:
  (A) initiating emulsion polymerization by forming a seed latex, the seed latex being formed in a batch emulsion polymerization process which comprises:
    (1) adding a first monomer charge to an aqueous emulsion polymerization medium, the first monomer charge comprising from about 3 to about 8 weight percent of a principal mixture of monomers, the principal mixture of monomers comprising from about 86 to about 92 mole percent vinylidene chloride and from about 14 to about 8 mole percent of a comonomer mixture of methyl methacrylate and a comonomer selected from the group consisting of acrylonitrile, methacrylic acid and methacrylonitrile, said comonomer mixture having a molar ratio of the comonomer to methyl methacrylate of from about 0.2:1 to about 5:1, the polymerization medium comprising water, an emulsifier and from about 0.5 to about 1.0 weight percent itaconic acid based on the principal mixture of monomers;

(2) adding a polymerization initiator to said emulsion polymerization medium, the initiator being added at a generally constant rate;

(3) continuing seed latex formation under autogenous pressure until a pressure drop in vapor pressure of monomers in the emulsion polymerization medium of from about 1.8 to about 2.2 pounds per square inch occurs;

(B) continuing polymerization under autogenous pressure by adding to the emulsion polymerization medium:

(1) a second monomer charge in an amount between about 85 and 92 weight percent of the principal mixture of monomers as in (A)(1), said second monomer charge being added at a generally constant rate sufficient to continually provide an excess of unreacted monomers in the polymerization medium, said excess being generally from about 2 to about 10 weight percent based on weight of the polymerization medium; and (2) the polymerization initiator at generally the same constant rate of addition as in (A)(2); and (C) generally immediately following addition of all of the second monomer charge, finishing polymerization in a predetermined time interval T, the time interval T having a first fractional part, a second fractional part and a third fractional part, by:

(1) continuing to add the polymerization initiator at generally the same constant rate of addition as in (A)(2) and (B)(2), the initiator being added throughout the time interval T; and (2) adding a third monomer charge in an amount between about 2 and 12 weight percent of the principal mixture of monomers as in (A)(1) said third monomer charge being added over the time interval T at the following sequential rates:

(a) about one-half the rate of addition of the second monomer charge as in (B)(1) for the first fractional part of the time interval T, the first fractional part being about T/6;

(b) about one-fourth the rate of addition of the second monomer charge as in (B)(1) for the second fractional part of the time interval T, the second fractional part being about T/3; and (c) adding only the initiator during the third fractional part, the third fractional part being about T/2.

9. The interpolymer produced in accordance with the process of claim 1 or claim 8.

10. A crystalline, controlled composition interploymer having polymerized therein (a) from about 86 to about 92 mole percent vinylidene chloride; (b) from about 14 to about 8 mole percent of a mixture of methyl methacrylate and a comonomer selected from the group consisting of acrylonitrile, methacrylic acid and methacrylonitrile, said mixture of methyl methacrylate and the comonomer having a molar ratio of the comonomer to methyl methacrylate of from about 0.2:1 to 5:1; and (c) from about 0.5 to about 1.0 weight percent itaconic acid based on weight of (a) plus (b); said interpolymer having a relative viscosity of from about 1.3 to about 1.7 at 25° C. as a 1 percent solution in tetrahydrofuran; said interpolymer being capable of forming a solution having a haze value of at least 80 percent transmission of visible light at 640 nanometers when present in an amount of about 20 percent solids in a solvent mixture, said solvent mixture comprising about 65 weight percent tetrahydrofuran based on solvent mixture weight, and about 35 weight percent toluene based on solvent mixture weight.

11. The interploymer of claim 10 further having a minimum heat-seal temperature of from about 70° C. to about 140° C., a water vapor transmission rate of no greater than 0.25 grams of water/100 square inches/24 hours at 38° C., an oxygen transmission rate of no greater than about 0.30 cubic centimeter of oxygen/100 square inches/24 hours/one atmosphere of oxygen at 25° C. and a crystallization ratio at 15 minutes at 80° C. of from about 0.5 to about 2 when deposited as a coating from a tetrahydrofuran laquer solution at a coating weight of 4 grams/square meter.

12. The interpolymer of claim 10 further having a minimum heat-seal temperature of from about 95° C. to about 130° C. when deposited as a coating with a coating weight of about 4 grams per square meter.

13. The interpolymer of claim 10 further having a haze value of at least 85 percent transmission of visible light at 640 nanometers.

14. A crystalline, controlled composition interpolymer having polymerized therein (a) from about 86 to about 92 mole percent vinylidene chloride; (b) from about 14 to about 8 mole percent of a mixture of methyl methacrylate and a comonomer selected from the group consisting of acrylonitrile, methacrylic acid and methacrylonitrile, said mixture of methyl methacrylate and the comonomer having a molar ratio of the comonomer to methyl methacrylate of from about 0.2:1 to 5:1; and (c) from about 0.5 to about 1.0 weight percent itaconic acid based on weight of (a) plus (b); said interpolymer having a relative viscosity of from about 1.3 to about 1.7 at 25° C. as a 1 percent solution in tetrahydrofuran; said interpolymer having a haze value of at least 80 percent transmission of visible light at 640 nanometers when present in an amount of about 20 percent solids in a solvent mixture, said solvent mixture comprising about 65 weight percent tetrahydrofuran based on solvent mixture weight, and about 35 weight percent toluene based on solvent mixture weight; the interpolymer having a minimum heat-seal temperature of from about 70° C. to about 140° C., a water vapor transmission rate of no greater than 0.25 grams of water/100 square inches/24 hours at 38° C., an oxygen transmission rate of no greater than about 0.30 cubic centimeter of oxygen/100 square inches/24 hours/one atmosphere of oxygen at 25° C., and a crystallization ratio at 15 minutes at 80° C. of from about 0.5 to about 2 when deposited as a coating from a tetrahydrofuran lacquer solution at a coating weight of 4 grams/square meter.

* * * * *